United States Patent
Mendelsohn et al.

(10) Patent No.: US 7,118,720 B1
(45) Date of Patent: Oct. 10, 2006

(54) METHOD FOR COMBINED REMOVAL OF MERCURY AND NITROGEN OXIDES FROM OFF-GAS STREAMS

(75) Inventors: Marshall H. Mendelsohn, Downers Grove, IL (US); C. David Livengood, Lockport, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 869 days.

(21) Appl. No.: 09/842,818

(22) Filed: Apr. 27, 2001

(51) Int. Cl.
*B01D 53/56* (2006.01)

(52) U.S. Cl. .................. 423/235; 75/742; 423/239.1
(58) Field of Classification Search .............. 75/742; 423/235, 239.1, 395, 210
See application file for complete search history.

(56) References Cited

U.S. PATENT DOCUMENTS

| | | | | |
|---|---|---|---|---|
| 1,029,528 A | * | 6/1912 | Bosch et al. | 423/235 |
| 4,035,470 A | * | 7/1977 | Senjo et al. | 423/235 |
| 5,328,673 A | * | 7/1994 | Kaczur et al. | 423/235 |
| 5,900,042 A | * | 5/1999 | Mendelsohn et al. | 75/742 |
| 6,447,740 B1 | * | 9/2002 | Caldwell et al. | 423/210 |

* cited by examiner

*Primary Examiner*—Stanley S. Silverman
*Assistant Examiner*—Maribel Medina
(74) *Attorney, Agent, or Firm*—Brian J. Lally; Daniel D. Park; Paul A. Gottlieb

(57) ABSTRACT

A method for removing elemental Hg and nitric oxide simultaneously from a gas stream is provided whereby the gas stream is reacted with gaseous chlorinated compound to convert the elemental mercury to soluble mercury compounds and the nitric oxide to nitrogen dioxide. The method works to remove either mercury or nitrogen oxide in the absence or presence of each other.

20 Claims, 1 Drawing Sheet

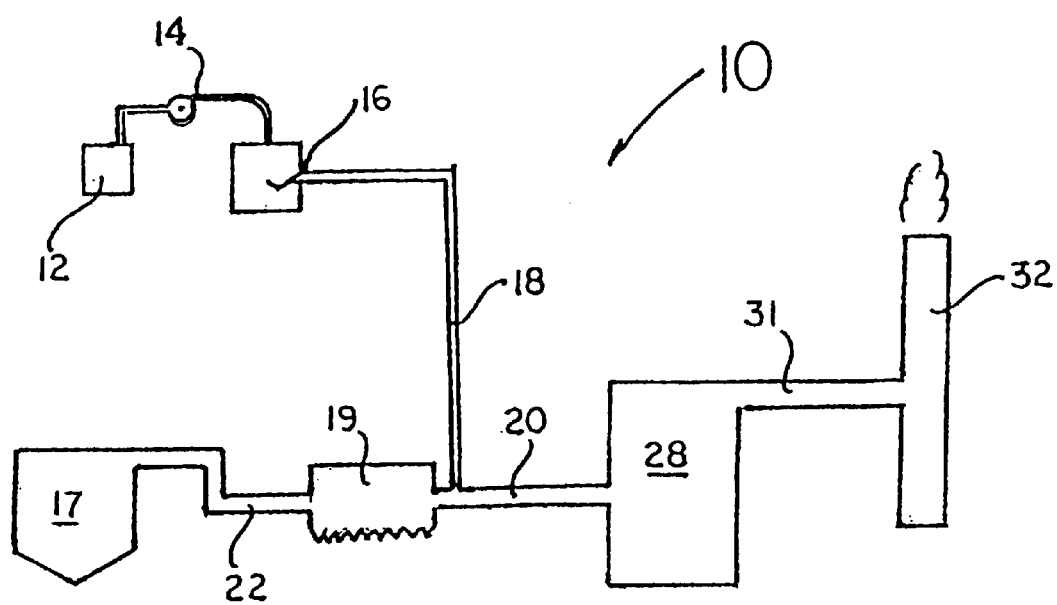

METHOD FOR COMBINED REMOVAL OF MERCURY AND NITROGEN OXIDES FROM OFF-GAS STREAMS

CONTRACTUAL ORIGIN OF INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

1. Field of the Invention

This invention relates to a method for removing toxic and otherwise dangerous impurities from gas streams and, more specifically, this invention relates to a new injection method for removing elemental mercury ($Hg^0$) and nitrogen oxides ($NO_x$) from off-gas or flue-gas streams by reacting them with vaporized oxidizing agents.

2. Background of the Invention

Mercury (Hg) was identified as a hazardous air pollutant in Title III of the 1990 Clean Air Act Amendments. It has assumed singular importance for the electric utility industry, particularly after the EPA concluded that coal-fired boilers generate a significant fraction of the total man-made mercury emissions in the United States. Indeed, the EPA has announced its intention to regulate Hg emissions from coal-fired power plants and is expected to propose regulations by 2003.

While utility sources are widely dispersed and seem extremely dilute by typical air-pollution standards, mercury (Hg) can have a lifetime of many months or even years in the atmosphere. Mercury is thus subject to long-range transport, which makes its control a national and international issue. Indeed, mercury, deposited in terrestrial/aquatic environments, tends to "bio-accumulate" in living organisms at concentrations considered neuro-toxic to animals (including man) at the top of the food chain.

Early estimates of utility control costs for mercury using duct injection of activated carbon range from about $25,000/lb to $70,000/lb of mercury removed. These costs can be contrasted with those for $NO_x$ control, which tend to be less than $2.50/lb of pollutant removed, and even that is usually considered expensive. ($NO_x$ is more nitric oxide (NO) with the remainder being nitrogen dioxide ($NO_2$).) With these high costs for "add-on" controls, techniques that utilize existing flue-gas cleaning systems for mercury and $NO_x$ removal would be desirable from both an economic and operational perspective.

Dry particulate-matter collectors, such as electrostatic precipitators, have not been shown to be very effective at capturing mercury, but some wet scrubbers installed for flue-gas desulfurization (FGD) have yielded high removals. However, the performances obtained with different scrubber systems have been highly variable with values that have ranged from about 10% to over 80%. Neither technology has any appreciable effect on $NO_x$ emissions.

In general, the fate of mercury and other trace elements liberated in the combustion process is influenced by the type of boiler, the operating conditions, other species present in the flue gas, and the type of flue-gas cleanup (FGC) system. Mercury is a particular problem because it belongs to a group of elements and compounds denoted as Class III, which exist primarily in the vapor phase within the boiler and the subsequent FGC system. It can also exist in several chemical species. The valences of mercury and chlorine underscore the likelihood of the covalent association of these two elements. In particular, the presence of chlorine in coal means that mercury can be found in both the elemental and oxidized forms, with the relative amounts depending on such factors as the original ratio of chlorine to mercury in the coal, gas temperatures, and length of exposure of the gas at various temperatures.

Another confounding factor in flue gas clean up is sulfur presence. All coals have a measurable sulfur content. Oxidation of coal (through combustion) will produce sulfur oxides ($SO_x$), which consist mostly of sulfur dioxide ($SO_2$) with small amounts of sulfur trioxide ($SO_3$) often present. Sulfur oxides have a detrimental effect upon such oxidizing agents as chlorine and bromine used to remove mercury. For example, while a liquid solution of chloric acid has been used as an oxidizing agent to remove elemental mercury from flue gases, its oxidizing effect is impeded by the presence of sulfur oxides found in the gases. Specifically, U.S. Pat. No. 5,900,042 awarded to the instant inventor Mendelsohn, et al. on May 4, 1999 discloses a method to convert elemental mercury in a gas stream to soluble mercury compounds. In that patent, removal of elemental Hg varied from 26.9% to 69.6% depending upon the experimental conditions. Hg removal in one set of experiments decreased to 48.2% from 69.6% upon the addition of $SO_2$ to the simulated effluent gas.

U.S. Pat. No. 5,328,673 awarded to Kaczur, et al. on Jul. 12, 1994 discloses a process for removing $NO_x$ and $SO_x$ from gaseous streams by contacting the gaseous stream with liquid chloric acid.

A disadvantage with the prior methods is that mixing of reactants is hindered when the liquid-phase oxidant contacts the gas-phase effluent. Another disadvantage is the increased energy loss which occurs when cooler liquid-phase oxidants are introduced into a heated reaction zone.

U.S. Pat. No. 5,785,932 awarded to Helfritch on Jul. 28, 1998 discloses a catalytic reactor for oxidizing elemental mercury vapor contained in a flue gas. The method teaches that the condensed mercuric oxide may be captured by a conventional particle collector.

A need exists in the art for a completely gaseous method for simultaneously removing $NO_x$ and elemental Hg from flue streams. The percentage removal of elemental Hg and $NO_x$ must not be diminished appreciably by the presence of other flue gas components such as $SO_x$. A combined process would have significant economic advantages over the use of two separate technologies for the removal of these two hazardous species.

SUMMARY OF THE INVENTION

An object of the present invention is to provide a method to simultaneously remove elemental Hg and $NO_x$ from flue gas that overcomes many of the disadvantages of the prior art.

Another object of the present invention is to provide a new method for using chloric acid to remove mercury from flue gas. A feature of the invention is that a gaseous oxidizing agent reacts with flue gas. An advantage is that the gas-to-gas interaction enhances oxidation of elemental mercury at least twenty-fold. Another advantage of the invented, single-phase reaction system is that it does not consume thermal energy from the gas stream being treated.

It is another object of the present invention to provide a method of removing elemental Hg that is not adversely affected by the presence of $SO_x$. A feature of the invention is that $SO_x$ does not reduce the extent of oxidation of elemental mercury and $NO_x$, as illustrated in Table 2, infra. An advantage is that less oxidizing agent is employed to remove elemental mercury and $NO_x$ in the presence of $SO_x$. Another advantage is that in some instances $SO_x$ enhances $Hg^0$ removal.

Still another object of the invention is to provide a more economical method for the combined removal of both elemental Hg and $NO_x$ from flue-gas stream that uses less oxidizing agent. A feature of the invention is that gaseous oxidizing agent contacts the flue-gas streams. An advantage is that approximately 80% less oxidizing agent is utilized for $Hg^0$ removal and 95% less oxidizing agent for NO removal compared to when liquid phase oxidizing agent is employed. Another advantage is that the method can remove either moiety in the absence or presence of the other.

Briefly, the invention provides a process for removing elemental mercury and $NO_x$ from a gaseous stream comprising vaporizing the aqueous oxidizing agent; contacting the vaporized agent with the gaseous stream for a time and at a temperature sufficient to form water soluble nitrogen and mercury-containing compounds; and removing the water soluble compounds from the gas stream.

Also provided is a method to simultaneously remove mercury and $NO_x$ from flue gas, the method comprising vaporizing an aqueous solution containing an oxidizing agent; contacting the vaporized oxidizing agent with the flue gas for a time and at a temperature sufficient to create soluble fractions of the mercury and nitric oxide; and isolating the fractions from the flue gas.

BRIEF DESCRIPTION OF THE DRAWING

The invention together with the above and other objects and advantages will be best understood from the following detailed description of the preferred embodiment of the invention shown in the accompanying drawing, wherein:

The FIGURE is a schematic diagram of the invented process, in accordance with features of the present invention.

DETAILED DESCRIPTION OF THE INVENTION

This invention teaches a method for removing $Hg^0$ and $NO_x$ from the off-gases of coal-fired power production facilities and other coal-combustion sources. The method is relatively simple, less expensive than current methods, more efficient, and has the advantage of functioning well even in the presence of $SO_x$. This latter feature facilitates more complete treatment of off-gases from coal-fired power plants and other coal-combustion sources (e.g., coal gasification plants).

Other applications of the invented method include the clean-up of gaseous effluents and waste streams associated with pulp and paper processing, gold processing, copper and lead smelting, waste incineration, or other operations dealing with mercury effluents.

The procedure involves utilizing gaseous halogen-containing compounds (such as chloric acid or chlorine dioxide) to efficiently oxidize elemental Hg to a water soluble species and at the same time efficiently oxidize nitric oxide (NO) to the more water soluble nitrogen dioxide ($NO_2$). That the mercury is converted to a water soluble species allows for the utilization of fairly common aqueous scrubbers for final removal and sequestration. Such aqueous scrubbers employ a myriad different alkaline moieties, including, but not limited to, NaOH, KOH, $Mg(OH)_2$, $Ca(OH)_2$, $Na_2CO_3$, $K_2CO_3$, $MgCO_3$, or $CaCO_3$ or combinations thereof.

Unlike previous methods for removal of Hg and $NO_x$, this method simultaneously removes both Hg and $NO_x$ from process off-gas streams. Mercury removal occurs with, or without, the presence of $NO_x$. When $NO_x$ is present, the inventors postulate one possible mechanism wherein the mercury reacts with a product or an intermediate of the nitric oxide removal process. The reaction involves nitric acid formed from the reaction of nitric oxide with gaseous chlorinated moieties, such as chloric acid and chlorine dioxide. As such, the invention facilitates the interaction between flue-gas constituents to enhance their removal from the flue-gas via the following chemical equations:

$$13NO + 6HClO_3 + 5H_2O \rightarrow 3NO_2 + 6HCl + 10HNO_3$$

$$Hg^0 + 2HNO_3 \rightarrow Hg(NO_3)_2 + H_2$$

$$5NO + 3ClO_2 + 4H_2O \rightarrow 3HCl + 5HNO_3$$

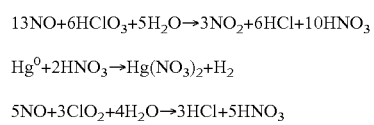

This invention also teaches that compared to more common methods, much lower concentrations of chloric acid are effective in removing Hg and NO. This method may be particularly useful for coal-fired utility boilers.

Additionally, the inventors have found that while sulfur dioxide typically has a detrimental effect upon oxidizing agents such as chlorine and bromine, the negative effects of sulfur dioxide are considerably less upon gaseous chloric acid or chlorine dioxide in the invented, single-phase process. In fact, some of the inventors' data show a small improvement in $Hg^0$ removal when sulfur dioxide is present in the effluent to be treated.

Aside from utilizing chlorinated acids as oxidizers in the invented method, bromine- and/or iodine-containing oxidizing agents (such as bromic- and iodic-acids) are also suitable.

Process Detail

Generally, an industrial apparatus for performing the invented method consists of an oxidizing solution vaporization system, a flue gas stream, a reaction vessel, and a scrubber for collecting liquid and gaseous, water-soluble products downstream from the reaction vessel. Principal components of a typical gas stream include, but are not limited to, mercury, nitrogen oxides, sulfur oxides, carbon oxides, hydrochloric acid, oxygen, nitrogen, water vapor, and combinations thereof. A gas stream also may contain inert materials such as argon, helium, neon, and other materials such as krypton, radon and xenon.

An exemplary device embodying salient features of the invented protocol is depicted as numeral 10 in the FIGURE. Oxidizing solution 12 such as chloric acid is first passed through a conduit 14 which is in turn in contact with a heat exchanger 16. The heat exchanger 16 is maintained at a temperature sufficient to vaporize the solution. An exemplary heat exchanger is an oil bath into which the conduit 14 is immersed. Oil bath temperatures of approximately 400 to 500° F. are sufficient to vaporize suitable oxidizing chlorine-containing solutions, such as chloric acid or chlorine dioxide. In industrial situations, residual heat from processing operations are utilized to facilitate vaporization of oxidizing agents.

Alternatively, an already gaseous chlorinated moiety, such as chlorine dioxide, is mixed with a flue gas stream 22, emanating from a boiler 17 and perhaps pretreated with an electro-static precipitator 19.

In either case, gaseous oxidizing agent 18 is routed to a reaction chamber 20, which in industrial settings can be nothing more than duct-work for routing gases away from a combustion chamber. The oxidizing agent then reacts with flue gas 22 traveling through the reaction chamber 20. The atmosphere of the reaction chamber 20 provides sufficient residence time to facilitate reaction between the mercury and nitric oxide in the flue gas 22 and oxidizing agent contained in the vaporized feed 18. Alternatively, actively mixing oxidizing agent with the flue gas stream will reduce the residence time required, such active mixing effected by situating oxidizing agent entry points in opposition to on-rushing flue gas streams.

A suitable concentration of reactants is where the oxidizing agent is present with the flue gas in a weight ratio of between approximately 1:500,000 and 1:100. In bench-top situations, the inventors have achieved good results where the oxidizing agent is between approximately 0.006 wt. % and 0.06 wt. % of the oxidizing agent-flue gas mixture.

A suitable ratio between oxidizing agent and elemental Hg in the flue gas is a weight ratio of between approximately 100,000:1 to 1000:1.

The presence of particulates in the flue gas are accounted for with a slight increase in reagent concentration and/or volume so as to prevent incomplete reaction due to absorption. Generally, however, particulates are a non-issue inasmuch as the oxidizing agent is added downstream of a particulate collector.

The barometric atmosphere of the reaction chamber is not critical and typically is maintained near ambient pressures, i.e., ±a few inches of water. However, a myriad of pressures can be utilized, depending on the pressure imposed on the system up-stream or down-stream of the reaction chamber.

Optionally, a gas analyzer (not shown) can be utilized to determine base-line concentrations and after-treatment concentrations of flue-gas constituents.

Downstream, a flue-gas desulfurization scrubber 28 containing an alkaline solution is utilized to capture liquified reaction products, sulfur moieties and other moieties. Such other moieties include $NO_2$, $SO_2$, $SO_3$, $Cl_2$, NOCl, $HgCl_2$, or excess reagent ($ClO_2$, $HClO_3$) entrained in any vapor phase product stream emanating from the reaction chamber 20.

Exemplary wet scrubbers include those disclosed in U.S. Pat. No. 5,900,042, to instant inventor Mendelsohn on May 4, 1999, and incorporated herein by reference.

Wet electrostatic precipitators are suitable to collect the product. Such devices are often used with incinerators and are increasingly being considered for use in conjunction with coal-fired boilers since they have potential to remove very fine, particulate matter.

A means of egress 32 is provided to facilitate final venting of the treated gas 31 from the system 10. In industrial settings, the means of egress may be an effluent stack.

The effects of different residence times of the gases in the reaction vessel 20 are noted in Table 3.

Oxidizing Agent Detail and Preparation

Generally, chlorine-containing oxidizing agents are utilized in the invented method. Suitable concentrations of oxidizing agent are where the oxidizing agent is present at from 0.01 wt. % to 5 wt. % of the aqueous solution containing the agent.

With regard to chloric acid, a myriad of avenues exist for procuring the chemical, including a simple reaction sequence utilizing sodium chlorate and sulfuric acid to yield chloric acid in an equilibrium process. That process is disclosed in *Comprehensive Inorganic Chemistry*, Eds.: J. C. Bailar, Jr., H. J. Emeleus, Sir Ronald Nyholm, and A. F. Trotman-Dickenson, p 1419 (Pergamon Press Ltd., Oxford, England, 1973), and incorporated herein by reference.

Further, chloric acid/sodium chlorate solutions are available commercially from a myriad of suppliers, including Tiajin Chenguan Chemicals Ltd. Co. Tianjin, China and Natawest Chemical Company, Tehran, Iran.

Commercially available alkali-metal chlorates and chlorites also are suitable.

Lastly, chlorine dioxide is available from a myriad of suppliers. Equipment for generating chlorine dioxide is also readily available.

Dilution of the commercially available solutions may be necessary. The oxidizing solutions were diluted herein in order to study the minimal amount of reagent required to achieve a certain level of either Hg or NO removal. Depending on the circumstances it is possible that higher reagent concentrations may be desirable in order to minimize the quantity of solution added. Generally, chlorine species concentrations of between 0.02 wt. % and 5 wt. % for the chloric acid/alkali metal chlorate solutions and 0.1 wt. % to 0.5 wt. % for the alkali metal hypochlorite/hypochlorous acid-chlorine solutions are suitable. Other concentrations are also appropriate.

Prior to contact with the flue gas, the oxidizing agents are vaporized. Suitable weight percents of oxidizing agents to the entire mixture are between 0.0007 weight percent and 2.0 weight percent. (In actual laboratory work-ups, upon mixing of the flue gas and the vaporized oxidizing agent, an amount of oxidizing agent was chosen to represent approximately 0.001 wt. % to 0.1 wt. % of the resulting mixture.)

Chloric acid amounts in the resulting mixture can range from 0.006 weight percent and 1.5 weight percent. Weight percents of between 0.006 weight % and 0.1 weight % were utilized in the laboratory.

Inasmuch as the molecular weight of chlorine dioxide is 80 percent that of chloric acid, weight ranges of from 0.005 wt % to 1.2 wt. % of that moiety to the entire mixture is suitable. In laboratory experiments, amounts of chlorine dioxide were chosen to result in a weight percent of the entire mixture of between 0.02 and 0.04 weight percent.

The vaporization temperature of the oxidizing agent, just prior to mixture with the subject gas, can be just above the condensation temperature of the aqueous solution (about 212° F. or 100° C.). Because of the much larger quantity of flue gas present compared to oxidizing solution, the flue gas temperature may be slightly lowered when admitting the "cooler" oxidizing vapors, but there should be a fairly rapid equilibration to nearly the same temperature as the flue gas.

EXAMPLES

A simulated gas stream was supplied. The source of $Hg^0$ was a calibrated and certified permeation tube from VICI Metronics, Santa Clara, Calif., which was placed in a constant-temperature water bath controlled to ±0.5° C. For the majority of the tests, the $Hg^0$ concentration in the gas was about 40 μg/m³ in the complete flue gas mixture. Bottled, high-purity (99.998%) nitrogen gas flowed around the permeation tube to produce a gas stream with a constant concentration of $Hg^0$. When other flue-gas components were desired, this stream was combined with another gas stream containing nitrogen and components such as carbon dioxide, nitric oxide, and sulfur dioxide. For example, when nitric oxide was present, carbon dioxide was used as a carrier gas for the nitric oxide. Carbon dioxide, nitric oxide, and sulfur dioxide were obtained from bottled gases without further purification. The nominal purities for these gases were as follows: carbon dioxide, 99.5%; nitric oxide,>99.0%; and sulfur dioxide,>99.98%.

After blending, the initial gas composition was checked with standard flue-gas analyzers such as those available from Rosemount Analytical, Orrville, Ohio. Typical concentrations of the various gas components were as follows: oxygen, 0–1%; carbon dioxide, 14–16%; nitric oxide, 30–450 ppm; and sulfur dioxide, 750–1,500 ppm.

The gas temperature was kept between 300° F. and 350° F. That temperature range is near-typical of power-plant flue gas upstream of a scrubber. Once the feed-gas composition was measured and stabilized, a 3-way valve was turned to divert the gas from the analyzers to a reaction vessel. Gas flow rates were about 5 liters per minute (LPM) for tests with only nitrogen and $Hg^0$ and about 6 LPM for the other tests.

Commercial solutions of chloric acid and chlorine (sold as sodium hypochlorite solutions) were diluted as necessary and used without further purification as the feed solutions for the new injection method. These oxidizing agents were first vaporized and maintained above their boiling points just prior to and during mixing with the simulated gas stream. The vaporized oxidizing agent was then mixed with the simulated gas stream. The rate of introduction of chloric acid into the reaction vessel varied from 0.0004 to about 0.004 grams/minute. Even lower rates of introduction of chloric acid can be used if less removal is desired or less Hg and/or NO are present. The oxidizing agent and the flue-gas were simultaneously introduced into the reaction zone. Any liquid remaining in the gas stream at the exit of the reaction zone was collected in the liquid sump.

Gaseous reactants and products were then directed to a bubbler that contained 200 mL of a 0.15 wt. % sodium hydroxide solution to remove any soluble species before exiting to an ice trap to remove condensables and then to the gas analyzers and a vent.

The test duration was typically 15 min. Actual residence times in the reaction zone varied from about 2 seconds to about 9.5 seconds. There was not any systematic variation of temperature. Rather, temperature values typically seen in flue gases of power plants were maintained. As such, temperatures of between 250° F. and 400° F. are suitable.

Following each test, liquid samples were saved from the sump and bubbler for total mercury analysis. Analyses were performed by a standard cold-vapor atomic absorption spectrophotometric method (U.S. EPA Method 7470A, SW-846). The estimated accuracy for this method is ±10% or ±0.02 mg/L, whichever is greater.

The results shown in TABLE 1 demonstrate that the invented process simultaneously removes $Hg^0$ and nitric oxide. TABLE 1 also shows both $Hg^0$ and NO removal increasing with increasing chloric acid concentration in the aqueous oxidizing vapor.

TABLE 1

$Hg^0$ and nitric oxide removals using a new injection method.

| Injected Oxidizing Vapor | $Hg^0$ Recovered In Liquid Phase (%) | NO Oxidation Rate (mL/min) |
|---|---|---|
| 0.10 wt. % chloric acid | 87 | 1.7–2.0 |
| 0.04 wt. % chloric acid | 57 | 1.0–1.1 |
| 0.02 wt. % chloric acid | 20 | — |

TABLE 2 shows that the inventors have found a method by which the presence of sulfur dioxide appears not to significantly degrade NO or $Hg^0$ removal. In fact, line one of Table 2 shows that $SO_2$ presence may enhance $Hg^0$ removal.

TABLE 2

$Hg^0$ and nitric oxide removals in the presence of $SO_2$.

| $SO_2$ presence | $Hg^0$ Removal | NO Removal |
|---|---|---|
| Present | 57% | 64% |
| Absent | 43% | 63–68% |

TABLE 3 shows that the $Hg^0$ removal was found to depend strongly on reaction time while nitric oxide removal was relatively insensitive to reaction time within the range studied.

TABLE 4 demonstrates a dramatic improvement in NO removal when the oxidizing agent was vaporized into the gas phase versus contacting the NO with small droplets of chloric acid from an ultrasonic atomizer. A similar NO removal can be attained with chloric acid concentrations twenty times lower when vaporization is used.

TABLE 3

$Hg^0$ and nitric oxide removals at different residence time

| Injected Oxidizing Vapor | Residence Time (sec) | $Hg^0$ Recovered In Liquid Phase (%) | NO Oxidation Rate (mL/min) |
|---|---|---|---|
| 0.1 wt. % chloric acid | 9.5 | 87 | 1.7–2.0 |
| 0.1 wt. % chloric acid | 4 | 58 | 1.7–1.9 |
| 0.1 wt. % chloric acid | 2 | 35 | 2.7–2.8 |

TABLE 4

NO Removal Performance for Different Injection Methods

| Chloric acid solution concentration | NO Removal (%) | Contacting method |
|---|---|---|
| 0.80 wt. % | 50 | Atomization |
| 0.04 wt. % | 64 | Vaporization |

Table 5 shows tests that gave about the same $Hg^0$ removals for a chloric acid solution with about a five-times lower concentration for the new vaporization/injection method as compared to the use of an ultrasonic atomizer.

TABLE 5

$Hg^0$ Removal Performance for Different Injection Method

| Chloric acid solution concentration | $Hg^0$ Removal (%) | Contacting method |
|---|---|---|
| 0.20 wt. % | 56 | Atomization |
| 0.04 wt. % | 57 | Vaporization |

TABLE 6 shows the effects of different $Hg^0$ concentrations on the process. As expected, the total amount of $Hg^0$ removed decreased as the inlet $Hg^0$ concentration decreased. However, the percentage removal of $Hg^0$ increased significantly at the lower inlet concentrations, which are typical of those found in power plant flue gas.

TABLE 6

Hg⁰ Removal Performance for Different Inlet Hg⁰ Concentrations

| Inlet Hg⁰ concentration ($\mu g/Nm^3$) | Total amount Hg⁰ removed ($\mu g$) | Hg⁰ Removal (%) |
|---|---|---|
| 37 | 1.12 | 33.1 |
| 22 | 0.83 | 40.9 |
| 9 | 0.52 | 60.5 |

In summary, the invented method provides a means of removing more than 90 percent of elemental mercury from process streams, and more than 90 percent of nitrogen oxides from process streams. The method can remove either moiety in the presence or absence of the other.

While the invention has been described with reference to details of the illustrated embodiment, these details are not intended to limit the scope of the invention as defined in the appended claims.

The embodiment of the invention in which an exclusive property or privilege is claimed is defined as follows:

1. A process for removing elemental mercury from a gaseous stream comprising:
    a) contacting a vaporized oxidizing agent with the gaseous stream for a time and at a temperature sufficient to form water soluble nitrogen and mercury-containing compounds, wherein the oxidizing agent comprises chloric acid and an alkaline metal chlorate; and
    b) removing the water soluble compounds from the gas stream.

2. The method as recited in claim 1 wherein the principal components in the gaseous stream are vaporized chemicals selected from the group consisting of mercury, nitrogen oxides, sulfur oxides, carbon oxides, hydrochloric acid, oxygen, nitrogen, water vapor, and combinations thereof.

3. A method as recited in amended claim 1, wherein the oxidizing agent converts NO to water soluble $NO_2$.

4. A method for simultaneously removing elemental mercury and NOx from a flue gas stream containing other constituents, the method comprising:
    g) vaporizing an aqueous solution containing an oxidizing agent, wherein the oxidizing agent is present in the aqueous solution at a concentration of between 0.001 and 5 weight percent; and
    h) contacting the vaporized oxidizing agent with the gaseous stream for a time and at a temperature sufficient to form water-soluble nitrogen- and mercury containing compounds; and
    i) removing the water-soluble compounds.

5. The method as recited in claim 1 wherein the oxidizing agent comprises chloric acid and an alkali metal chlorate.

6. The method as recited in claim 4 wherein the components in the gaseous stream are selected from the group consisting of mercury, nitrogen oxides, carbon oxides, hydrochloric acid, oxygen, nitrogen, water vapor, and combinations thereof.

7. A method as recited in amended claim 4, wherein the oxidizing agent is selected from the group consisting of chloric acid, chlorine dioxide, and chloric acid and an alkali metal chlorate.

8. A method as recited in amended claim 4, wherein the oxidizing agent is selected from the group consisting of chloric acid, chlorine dioxide, sodium chlorate, sodium chlorite, sodium hypochlorite, bromic acid, iodic acid, and combinations thereof.

9. A method to simultaneously remove mercury and nitric oxide from flue gas, the method comprising:
    n) vaporizing an oxidizing agent;
    o) contacting the vaporized oxidizing agent with the flue gas for a time and at a temperature sufficient to create water soluble mercury and nitrogen-containing compounds; and
    c) removing the water soluble compounds from the gas stream, wherein the water soluble compounds are removed using aqueous scrubbers employing alkaline moieties.

10. A method as recited in claim 9 wherein the oxidizing agent contains halogen compounds selected from the group consisting of chloric acid, chlorine dioxide, sodium chlorate, sodium hypochlorite, bromic acid, iodic acid, and combinations thereof.

11. The method as recited in claim 9 wherein the oxidizing agent is present with the Hg in the flue gas in a weight ratio between approximately 100,000:1 to 1000:1 of oxidizing agent:Hg.

12. The method as recited in claim 9 wherein the flue gas contains sulfur oxides at concentrations up to 4,000 ppm.

13. The method as recited in claim 9 wherein the oxidizing agent is present with the flue gas in a weight ratio between approximately 1:500,000 and 1:100 of oxidizing agent:flue gas.

14. A method as recited in amended claim 9, wherein the oxidizing agent is chlorine dioxide.

15. A method as recited in amended claim 9, wherein the oxidizing agent is chloric acid.

16. A method as recited in amended claim 9, wherein vaporization of the oxidizing agent is accomplished by passing it through a heat exchanger, the heat exchanger being at a temperature between 400 and 500° F.

17. A method as recited in amended claim 9, wherein the vaporized oxidizing agent contacts that gaseous stream in a counter current direction.

18. A method as recited in amended claim 9, wherein the alkaline moieties are selected from the group consisting of NaOH, $Mg(OH)_2$, $Ca(OH)_2$, $NaCO_3$, $K_2CO_3$, $MgCO_3$, $CaCO_3$ and combinations thereof.

19. A method to simultaneously remove mercury and nitric oxide from flue gas, the method comprising:
    a) contacting a vaporized oxidizing agent with the gaseous stream for a time and at a temperature sufficient to form water soluble nitrogen and mercury-containing compounds, wherein the oxidizing agent is selected from the group consisting of an alkali metal hydroxide, and alkaline earth metal hydroxide, an alkali metal carbonate, an alkaline earth metal carbonate and mixtures thereof; and
    b) removing the water soluble compounds from the gas stream.

20. A process for removing elemental mercury from a gaseous stream comprising:
    a) contacting a vaporized oxidizing agent with the gaseous stream for a time and a temperature sufficient to form water soluble nitrogen and mercury-containing compounds, wherein the oxidizing agent is selected from the group consisting of: chloric acid, chloric acid and an alkaline metal chlorate, chlorine dioxide or combinations thereof; and
    b) removing the water soluble compounds from the gas stream.

* * * * *